United States Patent [19]

Kawamura et al.

[11] Patent Number: 5,249,661
[45] Date of Patent: Oct. 5, 1993

[54] SYNCHRONIZER RING

[75] Inventors: Osamu Kawamura, Shimotsuga; Shigeo Murata, Sagamihara, both of Japan

[73] Assignees: Nippon Piston Ring Co., Ltd.; Nissan Motor Co., Ltd., both of Japan

[21] Appl. No.: 901,173

[22] Filed: Jun. 19, 1992

[30] Foreign Application Priority Data

Jun. 21, 1991 [JP] Japan ............... 3-150504

[51] Int. Cl.$^5$ ............................. F16D 23/04
[52] U.S. Cl. ............... 192/107 M; 192/53 F
[58] Field of Search ............. 192/70.14, 70.15, 53 E, 192/53 F, 107 M

[56] References Cited

U.S. PATENT DOCUMENTS

| 4,091,904 | 5/1978 | Beyer | 192/107 M |
| 4,597,484 | 7/1986 | Takiguchi et al. | 192/107 M X |
| 4,944,378 | 7/1990 | Christian | 192/107 M |
| 4,951,798 | 8/1990 | Knoess | 192/107 M |

FOREIGN PATENT DOCUMENTS

| 2055345 | 5/1972 | Fed. Rep. of Germany | 192/107 M |
| 3705661 | 9/1989 | Fed. Rep. of Germany | |
| 46-15043 | 4/1971 | Japan | |
| 886844 | 1/1962 | United Kingdom | 192/107 M |
| 745445 | 1/1964 | United Kingdom | 192/53 F |

Primary Examiner—Richard M. Lorence
Attorney, Agent, or Firm—Parkhurst, Wendel & Rossi

[57] ABSTRACT

A synchronizer ring for performing synchronous sliding operation with and separating operation from a rotating object member, comprises a ring body having a sliding surface in slidable contact with the object member and a molybdenum or molybdenum alloy flame-coated film formed on the sliding surface, the film having a ceramic present in an amount of 5 to 30 weight %. The flame-coated film may have a surface roughness (Rz) of 20 to 60 μm. The flame-coated film may further have a surface porosity of 5 to 30%, preferably 7 to 25% and a film thickness of 70 to 200 μm, preferably 90 to 120 μm.

15 Claims, 4 Drawing Sheets

SYNCHRONIZER RING

BACKGROUND OF THE INVENTION

This invention relates to a synchronizer ring stable in quality having a superior friction characteristic and an improved abrasion resisting property and durability.

A synchronizer ring is conventionally utilized for a synchromesh transmission, for example.

The synchronizer ring acts as a friction ring performing a synchronous sliding motion with a rotating opposite object member such as a taper cone of a clutch gear arrangement and performing a separating motion from the taper cone, thus significantly serving as a member for rendering equal peripheral speeds of two gears which are to be engaged with each other.

The synchronizer ring of the prior art has a structure in which a ring body having an outer peripheral portion on which a plurality of gear teeth, which are engaged with another rotating member, are formed with equally spaced relationship in the circumferential direction. The ring body is further provided with an inner peripheral portion contacting an opposite object such as the taper cone. A plurality of annular grooves are formed at the inner peripheral portion in its circumferential direction for imparting friction force, and at least one groove across the annular grooves may be formed thereto as occasion demands for escaping lubricating oil. In one type of such synchronizer ring, a key groove to which a synchronizer key is fitted is formed at the outer peripheral portion of the ring body. The synchronizer ring is generally made of brass (Cu-Zn alloy).

For the synchronizer ring of the structure described above, it is required to have an inner peripheral portion contacting another rotating member having an excellent friction characteristic and abrasion resisting property in addition to high mechanical strength and accuracy. Particularly, in the use for speed change gears or gear mechanisms for automobiles, it has been required for the synchronizer ring to have further improved friction characteristic and abrasion resisting property in accordance with recent requirement of a transmission mechanism of an automobile with high grade and performance as well as its improved maneuverability.

In accordance with such recent requirement, various studies have been made for providing a synchronizer ring having an inner peripheral portion having further improved friction characteristic and abrasion resisting property in comparison with the conventional synchronizer made of brass (Cu-Zn alloy).

For example, there is provided a synchronizer ring having an inner peripheral portion on which is formed, by a thermal spraying method, a layer formed of a material composed of metal, ceramic and oxide uniformly mixed with and fused to each other. Furthermore, there is also known a method of manufacturing a friction ring having an inner peripheral portion on which is formed by a flame jetting method a friction lining composed of a sintered powder material including metal powder component of 80 weight % and non metal powder material of 20 weight %.

However, the conventional synchronizer rings described above or manufactured by the method described above have not yet met desired friction characteristics and abrasion resisting properties. Furthermore, the conventional synchronizer rings suffer from inadequate strength due to insufficient diffusion of the respective metal components having instable qualities due to unevenness of materials of a flame-coated film. Moreover, incompletely fused particles or scattering-rebounding particles in the flame formed on the surface layer of the flame-coated film, and the adhesion of these particles onto the surface layer makes the surface of the film coarse. Overtime the friction characteristics of the ring changes and abrasion of parts of a transmission system of an automobile, for example, results from particles dropped down from the film surface. These also provide significant problems. In the conventional art, grinding work or cutting work is performed to the flame-coated film surface for the purpose of reducing the surface coarseness or roughness of the flame-coated film, but such workings involve are expensive and not economical.

SUMMARY OF THE INVENTION

An object of this invention is to substantially eliminate defects or drawbacks encountered in the prior art described above and to provide a synchronizer ring having a superior friction characteristics, a sufficient abrasion resisting property and a sufficient mechanical strength and being capable of providing a stable quality.

Another object of this invention is to provide a synchronizer ring provided with a flame-coated film to which no grinding operation or cutting operation is needed.

These and other objects can be achieved according to this invention by providing, in one aspect, a synchronizer ring for performing synchronous sliding operation with and separating operation from a rotating object member, the synchronizer ring comprising a ring body having a sliding surface slidable in contact with the object member and a flame-coated film formed on the sliding surface, the flame-coated film including a molybdenum or molybdenum alloy and a ceramic in an amount of 5 to 30 weight %.

In another aspect, there is provided a synchronizer ring for performing synchronous sliding operation with and separating operation from a rotating object member, the synchronizer ring comprising a ring body having a sliding surface slidable in contact with the object member and a flame-coated film formed on the sliding surface, the flame-coated film including molybdenum or a molybdenum alloy and a ceramic in an amount of 5 to 30 weight % and a surface roughness (Rz) of 20 to 60 μm.

In preferred embodiments, the ceramic is present in an amount of 10 to 20 weight % and the surface roughness is preferably of 30 to 55 μm. The flame-coated film has a surface porosity of 5 to 30%, preferably, 7 to 25%. The flame-coated film has a thickness of 70 to 200 μm, preferably 90 to 120 μm.

According to the present invention described above, the synchronizer ring provided with the molybdenum or molybdenum alloy flame-coated film has an improved friction characteristics and superior synchronism and separation properties with respect to the opposite object member such as taper cone of a clutch gear. In addition, the synchronizer ring provides sufficient abrasion resistance and durability, thus being stable in quality. According to this invention, no grinding work or cutting work to the flame-coated film is required.

Further characteristic features and effects of this invention will be made more clear by way of preferred embodiments in conjunction with the accompanying drawings.

DESCRIPTION OF THE PREFERRED EMBODIMENT

Figure 1:
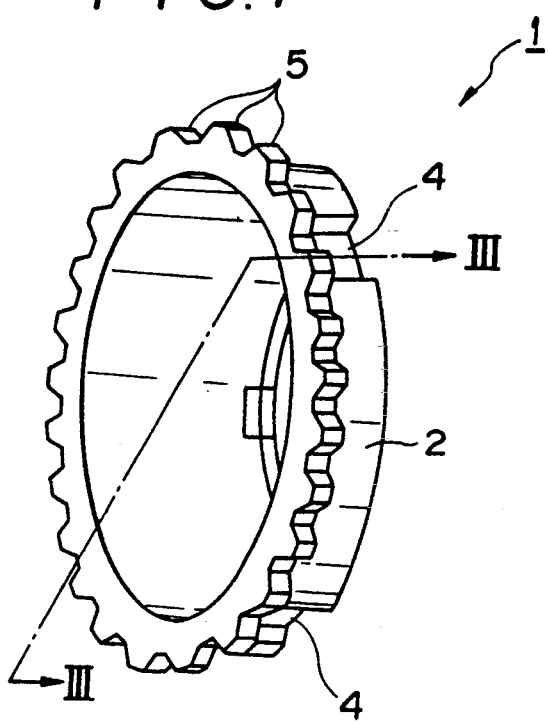
FIG. 1 is a perspective view of a synchronizer ring to which this invention is applicable.
Figure 2:
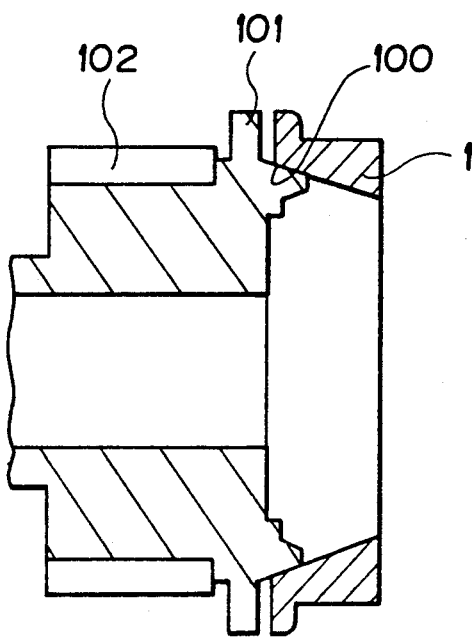
FIG. 2 is a longitudinal sectional view showing an engaged state of the synchronizer ring with an object member such as taper cone of a clutch gear.

FIG. 1 is a perspective view showing one example of a synchronizer ring to which this invention is applicable. The shown synchronizer ring 1 has a structure in which an annular ring body 2 having an outer peripheral portion on which a plurality of gear teeth 5, which are engaged with another rotating member, are formed with equally spaced relationship in the circumferential direction. The ring body 2 is further provided with an inner peripheral surface portion contacting an object member such as a taper cone of a clutch gear such as shown in FIG. 2. A plurality of annular grooves may be formed at the inner peripheral portion in its circumferential direction for imparting friction force, and at least one groove across the annular grooves may be also formed thereat as occasion demands for escaping lubricating oil. In one type of such synchronizer ring, a key groove 4 to which a synchronizer key is fitted is formed to the outer peripheral portion of the ring body 2.

Referring to FIG. 2, a part of a speed reduction gear arrangement, having a clutch gear 101, a speed reduction gear 102 and a taper cone 100 as an object member which is engaged with the synchronizer ring of the type shown in FIG. 1. The object member, i.e., taper cone 100, engages with the inner peripheral surface of the synchronizer ring 1 in the operating state.

Figure 3:
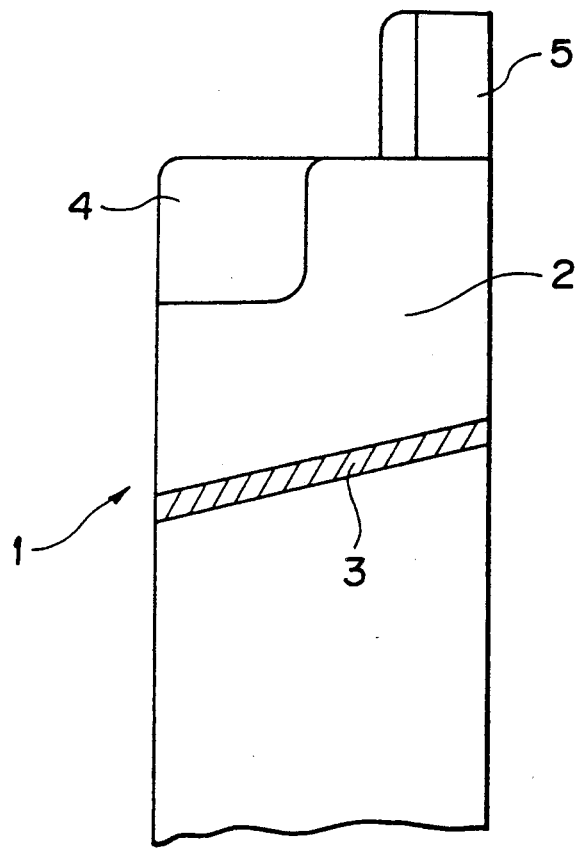
FIG. 3 is a sectional view taken along the line III—III in FIG. 1.

FIG. 3 is a schematic partial sectional view of the synchronizer ring 1 of FIG. 1, and with reference to FIG. 3, the synchronizer ring 1 is composed of a ring body 2 and a flame-coated film 3 formed on the inner peripheral surface of the ring body 2.

The ring body 2 is formed of, for example, various copper series alloys such as Cu-Zn series, Cu-Ni series, Cu-Al series, Cu-Sn series or Cu-Si series alloy, or iron series alloys such as Cr steel, Cr-Mo steel, Ni-Cr steel, Ni-Cr-Mo steel, Mn steel or Mn-Cr steel alloys.

The flame-coated film 3 includes molybdenum (Mo) or molybdenum alloy and the molybdenum alloy mainly consists of Mo and includes elements such as Cr, Si, B, C, Fe, and Ni.

Such Mo or Mo alloy usually has a soft phase having a hardness (Hv) in a range of 250 to 450, preferably of 300 to 400 and the soft phase occupies a surface area more than 70%, preferably more than 75%, of the total surface area.

When the soft phase contacts the object member, a micromatic plastic flow is caused and the soft phase can hence attain an effect for improving the synchronism of the synchronizer ring by enhancing the friction characteristic, particularly, dynamic friction coefficient. Accordingly, in a case where the occupying ratio of the soft phase on at least the surface area of the flame-coated film 3 is less than 70%, the ring may not have a sufficient dynamic friction coefficient. Further, in a case where the hardness (Hv) is less than 250, the micromatic plastic flow may overexceed and excess self abrasion may result when the synchronizer ring contacts the object member. On the contrary, in the case of the hardness (Hv) being over 450, the micromatic plastic flow may not progress sufficiently and a sufficient dynamic coefficient may not be attained.

The flame-coated film 3 includes ceramic particles, dispersed uniformly therein, of 5 to 30 weight %, preferably 10 to 20 weight %. It will be preferred to utilize, as such ceramic particles, an oxide, carbide, nitride of such as Si, B, Al, Mn, Cu, Co, Ni, Na, Cr, W, Ti and V. More concretely, there may be proposed a compound ceramic particle essentially consisting of $SiO_2$, NiO, MnO, CuO, CoO, $Na_2O$, $Al_2O_3$, $B_2O_3$, SiC, $Cr_2C_3$, $Si_3N_4$, $Mo_2N$, CrN, WC, TiN or VC, or a plural of $SiO_2$, NiO, MnO, Cuo, CoO, $Na_2O$, $Al_2O_3$, $RO_2$ (symbol R denotes a rare earth element herein), $K_2O$, MgO and $ZnO_2$.

The flame-coated film 3 in which the ceramic particles are uniformly dispersed in the weight percentage as described above can provide an increased dynamic friction coefficient and hence an improved friction characteristic. However, when the ceramic particles are present in an amount less than 5 weight %, self abrasion of the film is excessive and the abrasion resisting property may be degraded when the ceramic particles are present in an amount over 30 weight %, the abrasion of the object member such as taper cone may overexceed.

The hardness (Hv) of the flame-coated film 3 in which the ceramic particles are uniformly dispersed in the above ratio is usually in a range of 350 to 650. In the case of less than 350, the abrasion resisting property may adversely become insufficient, and on the contrary, in the case of over 650, the abrasion of the object member may be increased and the flame-coated film itself may become brittle.

Holes are usually formed at the flame-coated film 3, and the holes act to break the oil film and provide an oil bank, thereby increasing the dynamic friction coefficient between the synchronizer ring and the object taper cone (pressure apply or pressure reduction to the oil film), improving synchronism, reducing static friction coefficient and improving releasing ability.

An occupying ratio of the holes with respect to the surface of the flame-coated film 3, i.e., surface porosity, is usually of 5 to 30% and preferably of 7 to 25%. In the case of the surface porosity being less than 5%, the dynamic friction coefficient increases and hence the static friction coefficient reduces, and the above described functions are insufficiently attained. In the case of the surface porosity being over 30%, the mechanical strength of the flame-coated film 3 may become insufficient.

It is desired that the flame-coated film 3 has a surface roughness (Rz) of the sliding surface with respect to the object taper cone of a range of 20 to 60 μm and preferably in a range of 30 to 55 μm. In the case of the surface roughness (Rz) being in this range, the abrasion of the object taper cone can be much reduced and the degradation or change of the friction characteristic due to wear over time, revolutions, pressure, oil temperature or the like can be suppressed, and the superior friction characteristic can be hence maintained for a long time.

In order to set the surface roughness (Rz) in the above range, a brushing treatment will be effected to the surface, i.e., sliding surface, of the flame-coated film 3. For such brushing treatment, a metallic or non metallic brush including hard particles having a hardness (Hv) more than 1000 will be preferably utilized. As a practical example, a nylon brush including SiC grains, for example, having a hardness (Hv) of 2600 will be proposed.

In the case of the surface roughness (Rz) being less than 20 μm, such brushing treatment requires much time, resulting in manufacturing cost increase. On the contrary, in the case of the surface roughness being over 60 μm, the aforementioned function for suppressing the degradation or change of the friction characteristic may be attained.

The flame-coated film 3 is formed usually have a thickness of 70 to 200 μm and, preferably, 90 to 120 μm. In the case of this thickness being less than 70 μm, the hole quantity is lowered and, in some cases, a required friction characteristic will not be achieved. On the contrary, in the case of this thickness being over 200 μm, the flame-coated film 3 is liable to peel from the ring body 2, resulting in the degradation of the durability of the synchronizer ring itself and hence involving manufacturing cost increase.

The synchronizer ring of the structure and characteristics described above will be manufactured in the following manner.

Namely, a ring body 2 formed in a predetermined shape by an ordinary method is first prepared. Molybdenum powder or molybdenum alloy powder and the ceramic powders of the kind described above are mixed uniformly, are flame-coated on an inner peripheral surface of the ring body by a plasma flame coating method or other flame coating method, for example. The plasma flame coating method is preferred. The powders may be obtained by an atomizing method which is preferably utilized for the reason that, in the powders obtained by the atomizing method, the respective components are uniformly dispersed and distributed. After the flame-coated film 3 having a predetermined thickness has been formed on the inner peripheral surface of the ring body 2, the surface finishing is performed so that the surface roughness (Rz) of the flame-coated film 3 is preferably in a range of 20 to 60 μm by the brushing treatment. Such surface finishing process will eliminate a cutting work or grinding work for the flame-coated film. The synchronizer ring thus manufactured has an increased dynamic friction coefficient, an improved synchronism, a decreased static friction coefficient, an improved removability and a sufficient abrasion resisting property.

This invention will be further described concretely by way of preferred embodiments.

EMBODIMENT 1

A synchronizer ring was formed in the following manner. Namely, a molybdenum alloy flame-coated film was formed by effecting a plasma flame coating treatment, on the inner peripheral surface (sliding surface with respect to a taper cone as an object member) of a ring body made of a high strength brass (corresponding to a product of JIS HBsC3), with material powders (atomized powders) consisting of molybdenum alloy of −150 mesh structure (63.8%Mo-3.6%Cr-0.85%Si-0.68%B-0.17%C-0.85%Fe-balance Ni) to which ceramic particles (−250 mesh, $Cr_2C_3$ particles) were added with mixing ratio of 15 weight %.

With respect to the surface of the flame-coated film of the thus manufactured synchronizer ring, the surface was finished by using a nylon brush (diameter: 0.6 mm) including SiC grain particles (hardness (Hv): 2600) so as to provide the surface roughness (Rz) of 55 μm, thereby producing a synchronizer ring.

With respect to the thus produced synchronizer ring, a peel strength, a friction characteristic and an abrasion quantity of the molybdenum alloy flame-coated film were evaluated in accordance with the following conditions.

Peeling Strength: On the basis of JIS H 8666 Ceramic flame-coated Testing Method.

Figure 5:
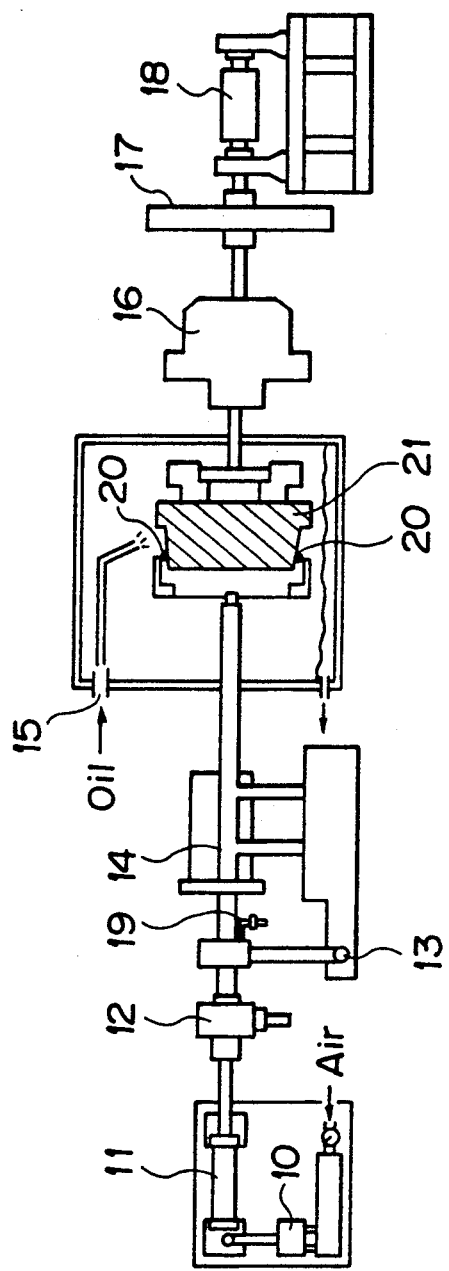
FIG. 5 is an illustrated view showing a synchronizer ring unit abrasion testing machine utilized for the embodiments according to this invention.

Friction Characteristic and abrasion Amount: These were measured under the following conditions by using a synchronizer ring unit abrasion testing machine of the structure shown in FIG. 5.

Test Condition: Constant Speed Slip Mode.
Press Load: 80 kgf.
Revolution Numbers: 800 rpm.
Pressing Time: 0.2 sec.
Utilized Lubricating Oil: 75 w 90-(80° C.) Oiling Rate: 0.6 liter/min.
Utilized Object Member:
Substance: SCr420 (surface hardness (Hv) 580)
Shape: Cone Taper (cone angle: 6°40″)
Engaging and Disengaging Numbers: 5000

Further, the synchronizer ring unit testing machine utilized for these embodiments is itself of a known structure generally including an electromagnetic valve 10, an air cylinder 11, a pressing load cell 12, a friction load cell 13, a ball bushing 14, a lubricating oil inlet 15, an electromagnetic clutch 16, a flywheel 17, and an AC servomotor 18. The reference numerals 20 and 21 denote a synchronizer ring and a taper cone respectively, and the abrasion amount was measured in accordance with a precipitation amount in an abrasion amount measuring unit 19.

The composition of the molybdenum alloy flame-coated film and the measured results are shown in the following Tables 1 to 2.

EMBODIMENTS 2-14

These embodiments were performed in the manner substantially identical to that performed with respect to the Embodiment 1 except that the material powders used in the Embodiment 1 were substituted with material powders having composition shown in Table 1 and the ceramic addition rate, the thickness of the flame-coated film and the finishing surface roughness (Rz), due to the brushing treatment were changed to those shown in Table 2.

In the Embodiments 4 to 9 and 14, the brushing treatment was not effected to the flame-coated films.

The compositions of the molybdenum alloy flame-coated films and the measured results are shown in Tables 1 and 2.

COMPARATIVE EXAMPLE 1

A synchronizer ring was manufactured by the manner substantially identical to that performed with respect to the Embodiment 1 except that material powders having composition shown in Table 1 with the ceramic addition rate of 35 weight % were utilized in place of the material powders used in the Embodiment 1, and the evaluation to the thus manufactured synchronizer ring was made.

The compositions of the molybdenum alloy flame-coated films and the measurement results are shown in Tables 1 and 2.

COMPARATIVE EXAMPLE 2

A synchronizer ring was manufactured by the manner substantially identical to that performed with respect to the Embodiment 1 except that material powders having composition shown in Table 1 with the ceramic addition rate of 3 weight % were utilized in place of the material powders used in the Embodiment 1 and the brushing treatment was not effected. The evaluation to the thus manufactured synchronizer ring was made.

The compositions of the molybdenum alloy flame-coated films and the measurement results are shown in Tables 1 and 2.

ANALYSIS OF RESULTS

Figure 4:
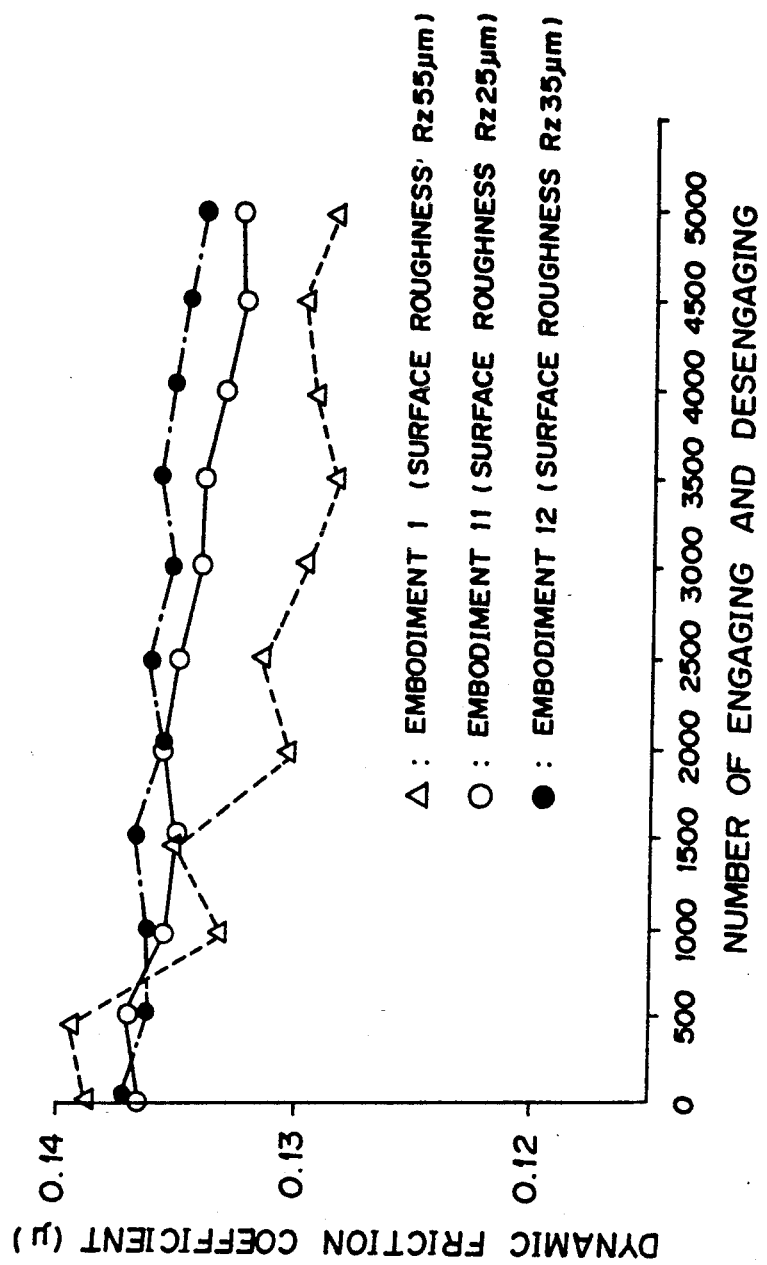
FIG. 4 is a graph showing relationship between surface roughness of the synchronizer ring according to this invention and dynamic friction coefficient thereof.

As can be seen from the Table 2, the synchronizer rings manufactured in accordance with the Embodiments of this invention have, in comparison with the synchronizer rings of the Comparative Examples, increased dynamic friction coefficients and improved friction characteristics. Furthermore, the Embodiments provided reduced abrasion quantities, superior abrasion resisting property and high peel strength of the flame-coated film with sufficient strength. The synchronizer rings according to the Embodiments showed stable quality. Furthermore, in the examination of the relationship between the surface roughness and the dynamic friction coefficient in the Embodiments 1, 11 and 12, results such as shown in FIG. 4 were obtained, from which was proved that the dynamic friction coefficient was less lowered when the surface roughness (Rz) was in a range of 20 to 60 μm, and hence, the degradation of the synchronism could be suppressed.

TABLE 1

Material Powder Composition and Friction Characteristic of Flame-coated Film

| | Material Powder Composition (wt %) | | | | | | | Soft Phase Content (vol %) | Ceramics Addition (wt %) | Hardness of Flame-coated Film (Hv) |
|---|---|---|---|---|---|---|---|---|---|---|
| | Mo | Cr | Si | B | C | Fe | Ni | | | |
| Embodiment 1 | 63.8 | 3.6 | 0.85 | 0.68 | 0.17 | 0.85 | bal | 85 | 15 | 460 |
| Embodiment 2 | 71.3 | 4.0 | 0.95 | 0.76 | 0.19 | 0.95 | bal | 85 | 5 | 355 |
| Embodiment 3 | 52.5 | 3.0 | 0.70 | 0.56 | 0.14 | 0.70 | bal | 75 | 30 | 650 |
| Embodiment 4 | 84.2 | — | — | — | — | — | bal | 90 | 15 | 350 |
| Embodiment 5 | 63.8 | 3.6 | 0.85 | 0.68 | 0.17 | 0.85 | bal | 70 | 15 | 430 |
| Embodiment 6 | 63.8 | 3.6 | 0.85 | 0.68 | 0.17 | 0.85 | bal | 85 | 15 | 550 |
| Embodiment 7 | 63.8 | 3.6 | 0.85 | 0.68 | 0.17 | 0.85 | bal | 85 | 15 | 580 |
| Embodiment 8 | 63.8 | 3.6 | 0.85 | 0.68 | 0.17 | 0.85 | bal | 85 | 15 | 400 |
| Embodiment 9 | 63.8 | 3.6 | 0.85 | 0.68 | 0.17 | 0.85 | bal | 65 | 15 | 620 |
| Embodiment 10 | 63.8 | 3.6 | 0.85 | 0.68 | 0.17 | 0.85 | bal | 85 | 15 | 320 |
| Embodiment 11 | 60.0 | 3.4 | 0.80 | 0.64 | 0.16 | 0.80 | bal | 85 | 20 | 480 |
| Embodiment 12 | 63.8 | 3.6 | 0.85 | 0.68 | 0.17 | 0.85 | bal | 85 | 15 | 465 |
| Embodiment 13 | 63.8 | 3.6 | 0.85 | 0.68 | 0.17 | 0.85 | bal | 85 | 15 | 475 |
| Embodiment 14 | 63.8 | 3.6 | 0.85 | 0.68 | 0.17 | 0.85 | bal | 85 | 15 | 450 |
| Comparative Example 1 | 48.8 | 2.8 | 0.65 | 0.52 | 0.13 | 0.65 | bal | 70 | 35 | 680 |
| Comparative Example 2 | 72.7 | 4.1 | 0.97 | 0.78 | 0.19 | 0.97 | bal | 90 | 3 | 320 |

TABLE 2

Material Powder Composition and Friction Characteristic of Flame-coated Film

| | Porosity (%) | Hardness of Flame-coated Film (μm) | Surface Roughness (Rz) | Peel Strength (kg/cm²) | Friction Characteristic | | Abrasion Amount (μm) | |
|---|---|---|---|---|---|---|---|---|
| | | | | | Dynamic *1μ | Static *2μ | Synchronizer Ring | Object Cone |
| Embodiment 1 | 15 | 100 | 55 | 150 | 0.135 | 0.108 | 2 | 55 |
| Embodiment 2 | 15 | 70 | 60 | 175 | 0.133 | 0.104 | 9 | 50 |
| Embodiment 3 | 15 | 70 | 50 | 140 | 0.135 | 0.110 | 1 | 80 |
| Embodiment 4 | 5 | 100 | 65 | 165 | 0.130 | 0.111 | 8 | 50 |
| Embodiment 5 | 5 | 100 | 65 | 160 | 0.127 | 0.108 | 3 | 45 |
| Embodiment 6 | 30 | 100 | 65 | 80 | 0.132 | 0.106 | 3 | 40 |
| Embodiment 7 | 3 | 100 | 65 | 180 | 0.120 | 0.111 | 7 | 60 |
| Embodiment 8 | 35 | 100 | 65 | 75 | 0.115 | 0.102 | 4 | 55 |
| Embodiment 9 | 10 | 100 | 65 | 145 | 0.110 | 0.104 | 2 | 90 |
| Embodiment 10 | 10 | 60 | 60 | 150 | 0.115 | 0.108 | 7 | 75 |
| Embodiment 11 | 10 | 100 | 25 | 160 | 0.131 | 0.106 | 1 | 30 |
| Embodiment 12 | 10 | 100 | 35 | 165 | 0.135 | 0.108 | 2 | 35 |
| Embodiment 13 | 10 | 200 | 55 | 85 | 0.106 | 0.132 | 2 | 25 |
| Embodiment 14 | 10 | 100 | 70 | 155 | 0.112 | 0.133 | 5 | 65 |
| Comparative Example 1 | 5 | 100 | 55 | 135 | 0.109 | 0.120 | 1 | 120 |
| Comparative Example 2 | 10 | 100 | 65 | 180 | 0.115 | | 15 | 40 |

*1Dynamic friction coefficient
*2Static friction coefficient

What is claimed is:

1. A synchronizer ring for synchronous operation with and separating from an object member, comprising:

a ring body having a sliding surface for slidable contact with the object member;

a flame-coated film formed on the sliding surface, said flame-coated film comprising one of molybdenum and molybdenum alloy, and a ceramic material present in an amount of 5-30% by weight.

2. The synchronizer ring of claim 1, wherein the flame-coated film has a surface roughness (Rz) of 20-60 μm.

3. The synchronizer ring of claim 2, wherein said surface roughness (Rz) is 30-55 μm.

4. The synchronizer ring of claim 1, wherein said ceramic material is present in an amount of 10-20% by weight.

5. The synchronizer ring of claim 1, wherein the flame-coated film has a surface porosity within the range of 5-30% of a total surface area thereof.

6. The synchronizer ring of claim 1, wherein the flame-coated film has a thickness of 70-200 μm.

7. A synchronizer ring for synchronous operation with and separating from an object member, comprising:
   a ring body having a sliding surface for slidable contact with the object member;
   a flame-coated film formed on the sliding surface, said flame-coated film comprising one of molybdenum and molybdenum alloy, and a ceramic material present in an amount of 5-30% by weight, wherein said one of molybdenum and molybdenum alloy has a soft phase, said soft phase comprising not less than 70% of a total surface area of said flame-coated film.

8. The synchronizer ring of claim 7, wherein the flame-coated film has a surface roughness (Rz) of 20-60 μm.

9. The synchronizer ring of claim 8, wherein said surface roughness (Rz) is 30-55 μm.

10. The synchronizer ring of claim 7, wherein said ceramic material is present in an amount of 10-20% by weight.

11. The synchronizer ring of claim 7, wherein the flame-coated film has a surface porosity within the range of 5-30% of the total surface area.

12. The synchronizer ring of claim 7, wherein the flame-coated film has a thickness of 70-200 μm.

13. The synchronizer ring of claim 7, wherein said soft phase has a hardness (Hv) within a range of 250-450.

14. The synchronizer ring of claim 13, wherein said hardness of said soft phase is within a range of 300-400.

15. The synchronizer ring of claim 7, wherein said soft phase comprises not less than 75% of a total surface area of said flame-coated film.

* * * * *